(No Model.)

J. W. SEE.
SCALE FOR STEAM ENGINE INDICATORS.

No. 282,931. Patented Aug. 7, 1883.

WITNESSES:
John R. Woods
J. W. Cornell

James W. See INVENTOR

UNITED STATES PATENT OFFICE.

JAMES W. SEE, OF HAMILTON, OHIO, ASSIGNOR TO THE ASHCROFT MANUFACTURING COMPANY, OF MASSACHUSETTS AND NEW YORK.

SCALE FOR STEAM-ENGINE INDICATORS.

SPECIFICATION forming part of Letters Patent No. 282,931, dated August 7, 1883.

Application filed December 18, 1882. (No model.)

*To all whom it may concern:*

Be it known that I, JAMES W. SEE, of Hamilton, Butler county, Ohio, have invented certain new and useful Improvements in Scales for Steam-Engine Indicators, of which the following is a specification.

The object and nature of the invention will be understood from the following description and the accompanying drawings, in which—

Figure 1:
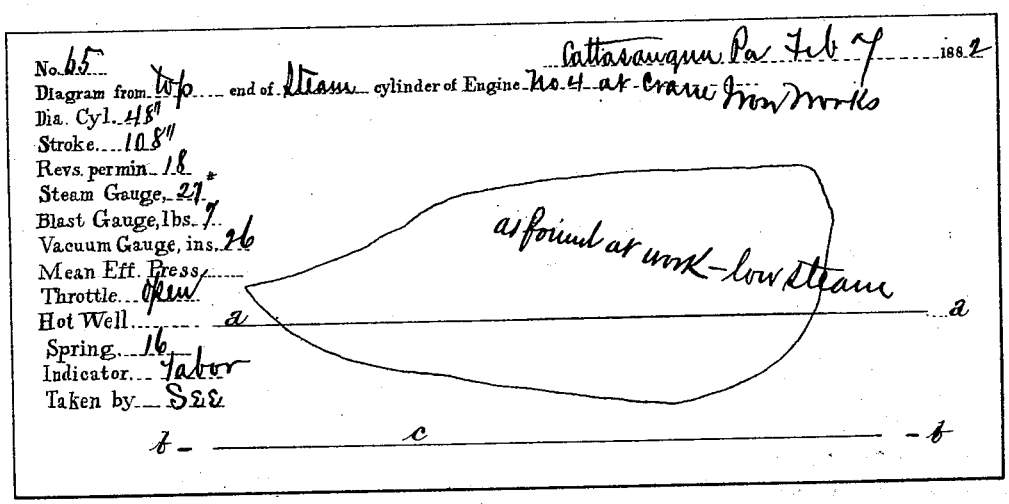
Figure 2:
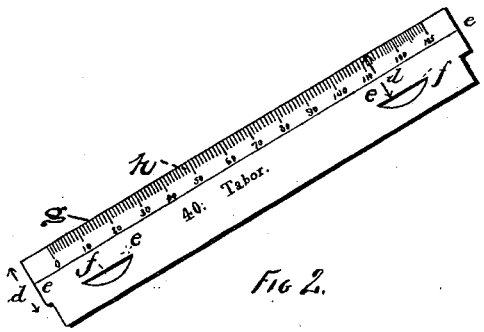

Figure 1 illustrates a steam-engine indicator diagram, and Fig. 2 a scaling-instrument embodying my improvements.

The steam-engine indicator is a steam-pressure gage arranged to be attached to a steam-engine and record the varying cylinder-pressure upon a paper moving coincidently with the piston. The paper is termed a "card" or "diagram," and shows the changes in pressure throughout the strokes of the engine. The higher the pencil-line above a zero-line the higher the pressure. The zero-line is made by the indicator when no steam is acting upon it. Each pound of pressure acting upon the indicator raises the pencil a certain amount, and the diagram is measured with a scale graduated into pounds. The zero-line is not such in fact. It is really the line of atmospheric pressure, and the zero-line would lie below a distance representing the pressure of the atmosphere, which is generally taken at fourteen and seven-tenths pounds. Any true analysis of a steam-diagram requires that the pressures be measured from the absolute zero-line; therefore the first step is to draw that line.

In Fig. 1 of the drawings is shown a diagram taken by an indicator. *a a* is the atmospheric line drawn by the indicator. To draw the absolute zero-line, locate the two points *b b*, measured fourteen and seven-tenths pounds below the atmospheric line. Then, with a straight-edge, draw the absolute zero-line *c* through these points. To locate the two points *b b* is a delicate operation, requiring a fine-pointed instrument and a fine eyesight to take the fine measurement from the scale. Great care is also required in setting the straight-edge accurately to these points. In practice the line is seldom accurately located. The present invention combines a straight-edge and gaging-scale.

In Fig. 2 of the drawings is shown a scale with its edge *g* graduated into pounds. At *e* are width-gages, representing fourteen and seven-tenths pounds by the edge-scale. In using the instrument, the back of the width-gages *e* is brought to correspond with the atmospheric line of the diagram, and the absolute zero-line is drawn along the edge of the scale. The instrument shown in Fig. 2 is seen to be prominently marked "40." This indicates that the scale is adapted for drawing the absolute zero-lines upon diagrams based upon a pressure-scale of one-fortieth of an inch to the pound. For the purpose of this invention the straight-edge feature of the scale must essentially be combined with the widthing-gage and with the figure to designate the scale of the pressures upon which the width-gage is based.

I claim as my invention—

1. The improved instrument for use with steam-engine indicators, consisting of a straight-edge bearing a figure designating the unit of a certain scale of pressures, and a width-gage corresponding to fourteen and seven-tenths of the units designated by such figure, combined substantially as and for the purpose specified.

2. The improved instrument for use with steam-engine indicators, consisting of a straight-edge, a figure on said straight-edge designating the unit of a certain scale of pressures, a line of graduations of the scale of pressures designated by such figure, and a width-gage corresponding to fourteen and seven-tenths of the units designated by such figure, combined substantially as and for the purpose specified.

JAMES W. SEE.

Witnesses:
JOHN R. WOODS,
J. W. CORNELL.